United States Patent [19]

Nagase et al.

[11] Patent Number: 5,016,970

[45] Date of Patent: May 21, 1991

[54] FERRULE FOR OPTICAL FIBER TRANSMITTING LINEARLY POLARIZED LIGHT AND OPTICAL FIBER CONNECTOR USING THIS FERRULE

[75] Inventors: Ryo Nagase, Mito; Juichi Noda, Machida; Etsuji Sugita, Tachikawa, all of Japan

[73] Assignee: Nippon Telegraph and Telephone Corp., Japan

[21] Appl. No.: 392,069

[22] Filed: Aug. 10, 1989

[51] Int. Cl.[5] .................................................. G02B 6/38
[52] U.S. Cl. ................................ 350/96.21; 350/96.20
[58] Field of Search ................ 350/96.20, 96.21, 96.22

[56] References Cited

U.S. PATENT DOCUMENTS 4,268,115 5/1981 Sleman et al. ............... 350/96.20 X
4,726,647 2/1988 Kakii et al. ................... 350/96.20 X Primary Examiner—John D. Lee
Assistant Examiner—Phan T. Heartney
Attorney, Agent, or Firm—Wigman & Cohen

[57] ABSTRACT

A ferrule for optical fibers transmitting linearly polarized light capable of preventing deterioration and fluctuation of the extinction ratio. The ferrule incorporates at least two paths connecting a region in a vicinity of an end of a puncture for an optical fiber inside the flange portion with outside of the ferrule. These paths effectively enable the removal of air in such a region which could have caused an extraneous stress on the optical fiber resulting in deterioration of the extinction ratio. An optical fiber connector using this ferrule is also disclosed.

17 Claims, 16 Drawing Sheets

FIG.3(A)
PRIOR ART
FIG.3(B)
PRIOR ART
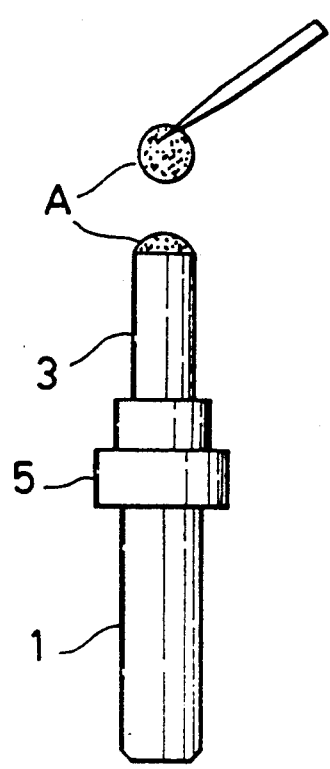
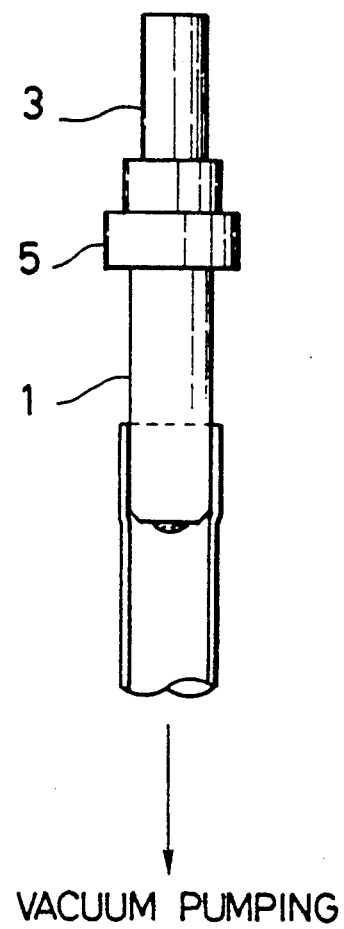
VACUUM PUMPING

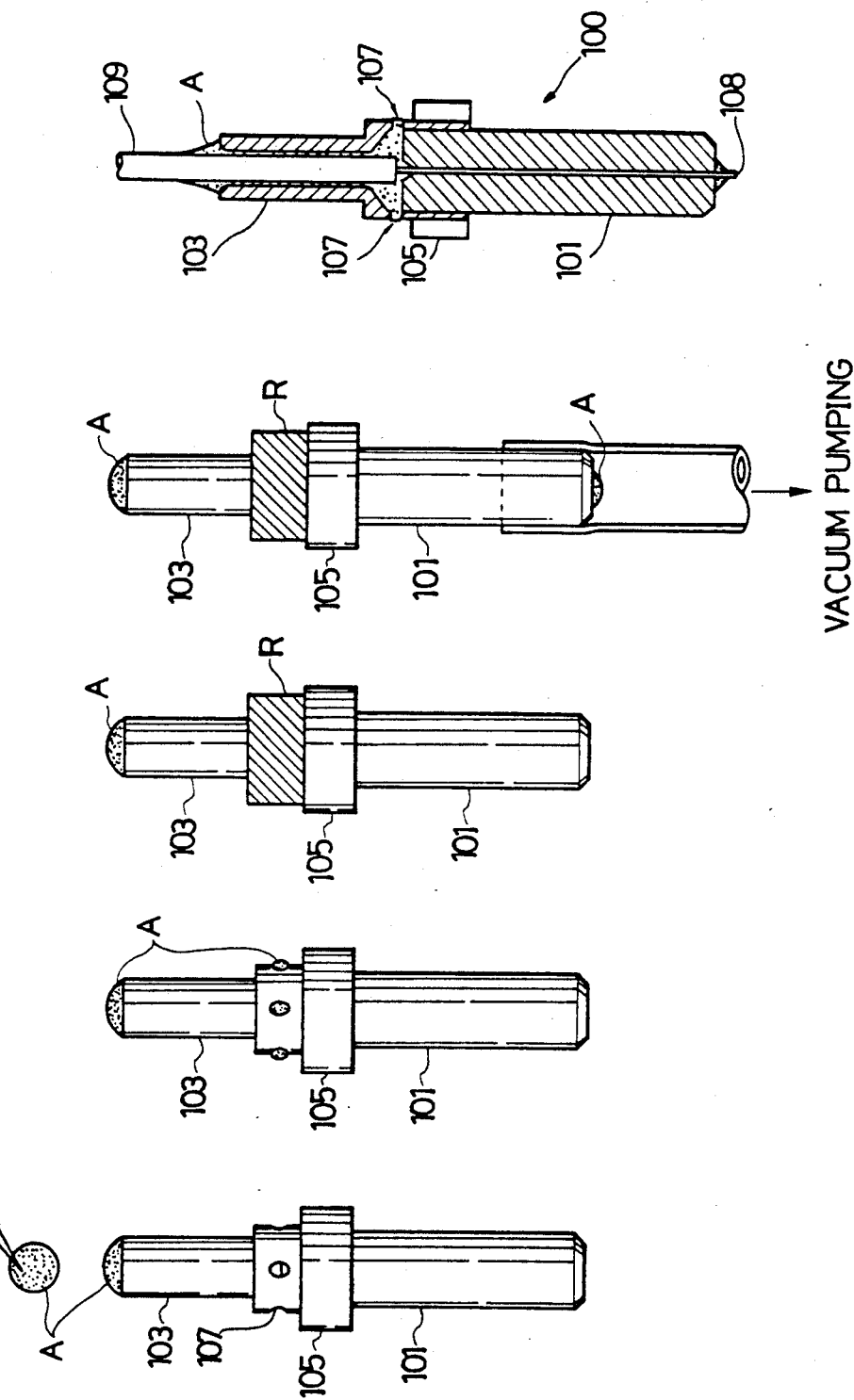

F I G. 18(A)
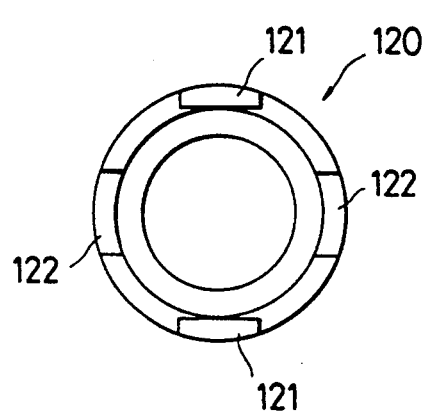
F I G. 18(B)
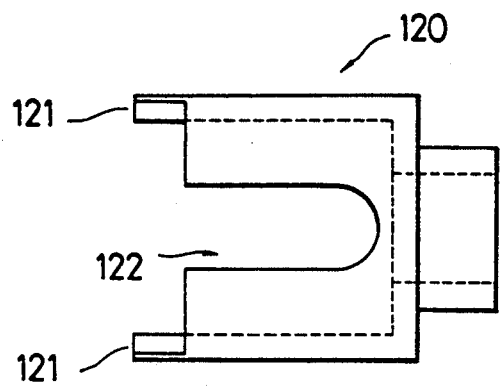
F I G. 19(A)
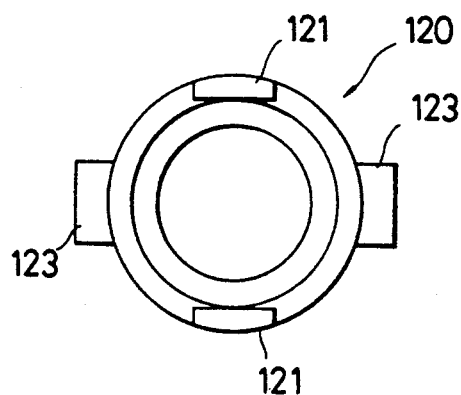
F I G. 19(B)
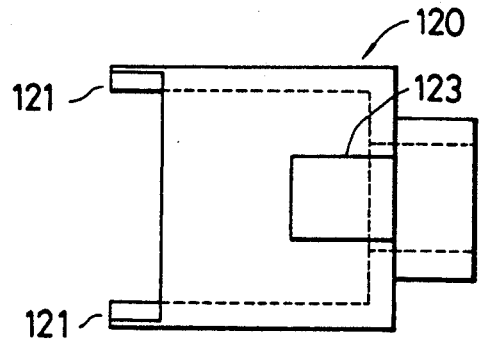

FERRULE FOR OPTICAL FIBER TRANSMITTING LINEARLY POLARIZED LIGHT AND OPTICAL FIBER CONNECTOR USING THIS FERRULE

BACKGROUND OF THE INVENTION

1. Field of the Invention

The present invention relates to a ferrule for an optical fiber, capable of transmitting linearly polarized light, and an optical fiber connector for such optical fibers using such a ferrule.

2. Description of the Background Art

A ferrule is most commonly utilized in an optical fiber connector for connecting an optical fiber with other optical fibers or optical elements, but other uses such as those in a collimator, in an LD module, and in an optical fiber terminal are also known.

Conventionally, there are two types of ferrule both of which are suitable for single mode optical fibers. One type is a zirconia ferrule shown in FIG. 1 comprising an insertion portion 1 made of zirconia ceramic, with a puncture 2 for an optical fiber, a flange portion 3 made of stainless steel, with an open end 4 for receiving a coated optical fiber, having a tapering inner diameter between a part including the open end 4 which has a smaller diameter and another part including another end to be attached to the insertion portion 1 which has a larger diameter, and a keyway 5 for receiving connection keys of a plug housing in which the ferrule is to be installed.

Another type is a capillary type ferrule shown in FIG. 2 comprising an insertion portion 11 with an open end 12 for receiving a coated optical fiber, a capillary 13 made of alumina ceramic, with a puncture 14 for an optical fiber, attached to another end of the insertion portion, and a keyway 15 for receiving connection keys of a plug housing in which the ferrule is to be installed. This type of ferrule may also have a hole 16 at a foot of the keyway 15 whose role will be explained later.

Among these two types, the zirconia type of FIG. 1 is usually a preferred choice because of its high reliability due to higher hardness and bending strength of the insertion portion 1, its inexpensiveness due to its simple configuration, and a stability of its operation. This last point is due to the fact that zirconia ceramic has a lower Young's modulus than alumina ceramic, so that by polishing the ends of ferrules into round shape and pressing each other along their central axes the fiber cores can be maintain in a physical contact by the deformation of the edges of ferrules even when the fibers happened to be drawn into the ferrules.

Meanwhile, there are single mode polarization maintaining optical fibers (referred hereafter as SMPM fibers) which can transmit linearly polarized light with its polarization state maintained. Namely, the SMPM fiber can maintain the polarization state of the polarized light which is linearly polarized along the birefringent axes of the optical fiber. This property is usually evaluated in terms of a parameter called an extinction ratio which is a ratio of an output power of the linearly polarized light entered in a direction of a main axis of the birefringent axes with respect to that in a direction perpendicular to the main axis. This extinction ratio may take a value in a range of −40 to −50 dB for a short SMPM fiber of about 10 m long. In such a SMPM fiber, when the internal stresses are produced by bending of the optical fiber, the extinction ratio can increases due to the appearance of other birefringence inside the optical fiber.

Now, in attaching the optical fiber to the zirconia ferrule of FIG. 1, the epoxy adhesives A are dropped from the open end 4 of the flange portion 3 as shown in FIG. 3(A), and the air inside the flange portion 3 are extracted through the puncture 2 of the insertion portion 1 by vacuum pumping as shown in FIG. 3(B), to fill the inside of the ferrule with adhesives A. The optical fiber is then inserted into the ferrule, and fixed by heating up to stiffen the adhesives A.

In this process of filling the adhesives, the air bubbles B frequently appears near the connection between the insertion portion 1 and the flange portion 3 due to the tapering inner diameter of the flange portion 3 in this region, as shown in FIG. 3(C). When the stiffening of the adhesives A is carried out with such bubbles B near the connection between the insertion portion 1 and the flange portion 3, the volume contraction accompanying the stiffening of the inhomogeneously distributed adhesives A causes an extraneous stress exerted on the optical fiber 6, as shown in FIG. 3(D). In FIG. 3(D), the bending of the optical fiber 6 is exaggerated for clarify, and this optical fiber 6 stems from the coated optical fiber 7 which is inserted from the open end 4 of the flange portion 3. As mentioned above, such an extraneous stress is not problematic for single mode optical fibers, but it can cause an increase of the extinction ratio for the SMPM fibers.

In case of the capillary type ferrule of FIG. 2, there may be the hole 16 provided at the foot of the keyway 15 for the purpose of removing the air inside the insertion portion 11 as mentioned above, but this hole 16 cannot be made in the vicinity of the connection of the insertion portion 11 and the capillary 13 as such region is a part of a portion to be inserted into an alignment sleeve of an adaptor in which two ferrules are contacted each other, so that the air bubbles appearing in this region cannot be removed.

Thus, conventionally, the SMPM fiber suffers from the deterioration of the extinction ratio occurring when attached to the ferrule in the optical fiber connector.

As for the optical fiber connector, a most common type is an FC type optical fiber connector shown in FIG. 4. In this FC type optical fiber connector, an optical fiber stemming from a coated optical fiber 20 is attached at a center of an end face of a ferrule 21 installed into a plug housing 22 and inserted into an alignment sleeve 23 in which the other end face of the ferrule 21 is contacted with an end face of another ferrule inserted from the opposite side of the alignment sleeve 23, as the ferrule 21 is pressed by a spring 24 along its central axis.

In such an optical fiber connector for single mode optical fiber, the connection keys of the plug housing are engaged with the keyway of the ferrule such that the rotation of the ferrule is restricted so as to be able to contact the optical fibers at a desired relative angle around their central axes, as shown in FIG. 5(A).

Furthermore, in such an optical fiber connector for single mode optical fiber, the ferrule is not rigidly fixed with respect to the plug housing, in order to tolerate some external stress and improve the stability. This is achieved by providing about 0.2 mm clearance between the connection keys of the plug housing and the keyway of the ferrule as shown in FIG. 5(B).

However, when such an optical fiber connector is used for SMPM fibers, the fluctuation of the relative angle of the optical fibers due to this clearance can cause a deterioration of the extinction ratio as a consequence of the deviated optical fiber angle relation. In general, this relative angle is required to be within a range of 0.5° for the extinction ratio of −40 dB, or a range of 2° for the extinction ratio of −30 dB.

In the FC type optical fiber connector with about 0.2 mm clearance between the connection keys of the plug housing and the keyway of the ferrule, for the ferrule with the flange portion of outer diameter 4.6 mm, the maximum deviation of the relative angle is:

$$\tan^{-1}(0.2/2.3) \approx 5°$$

for which the extinction ratio is:

$$10 \log(\tan^2(5°)) \approx -21 \text{ dB}$$

which is considered not satisfactory in practice.

Moreover, in the FC type optical fiber connector of FIG. 4, the torque for rotating the ferrule is produced by tightening of the coupling nut around the plug housing 22 at a time of coupling, so that the extinction ratio can be further deteriorated.

FIG. 6 shows the extinction ratios as a function of a number of coupling and uncoupling, obtained by trials using an FC type optical fiber connector for SMPM fibers. As can easily be seen from this FIG. 6, the angle of the ferrule is randomly changed at each coupling so that the extinction ratio fluctuates very largely, which implies that the operation is not stable.

SUMMARY OF THE INVENTION

It is therefore an object of the present invention to provide a ferrule for optical fibers transmitting linearly polarized light and an optical fiber connector using such a ferrule, capable of preventing deterioration and fluctuation of the extinction ratio.

According to one aspect of the present invention there is provided a ferrule for optical fibers transmitting linearly polarized light, comprising: insertion portion with a puncture for an optical fiber; and flange portion with an open end for receiving a coated optical fiber, having a tapering inner diameter between a part including the open end which has a smaller diameter and another part including another end to be attached to the insertion portion which has a larger diameter, including at least two paths connecting a region in a vicinity of an end of the puncture inside the flange portion with outside of the ferrule.

According to another object of the present invention there is provided an optical fiber connector for optical fiber transmitting linearly polarized light, comprising: a pair of ferrules to be contacted with each other, each ferrule including: insertion portion with an end face to be contact and a puncture for an optical fiber reaching to an end face to be contacted; and flange portion with an open end for receiving a coated optical fiber, having a tapering inner diameter between a part including the open end which has a smaller diameter and another part including another end to be attached to the insertion portion which has a larger diameter, including at least two paths connecting a region in a vicinity of an end of the puncture inside the flange portion with outside of the ferrule; a pair of plug housings for installing the pair of ferrules, each plug housing including a spring for pressing the ferrule installed along its central axis; and an alignment sleeve for receiving the insertion portion of the pair of ferrule such that the end faces of the pair of ferrules are contacted with each other.

Other features and advantages of the present invention will become apparent from the following description taken in conjunction with the accompanying drawings.

BRIEF DESCRIPTION OF THE DRAWINGS

FIGS. 8(A), (B), (C), and (D) are transverse views of the ferrule of FIGS. 7(A) and (B) for explaining attaching of optical fiber to the ferrule.

FIG. 8(E) is a transverse cross sectional view of the ferrule of FIGS. 7(A) and (B) for explaining attaching of optical fiber to the ferrule.

FIGS. 18(A) and (B) are a side end view and a top plan view, respectively, of one embodiment of an intermediate member of the optical fiber connector of FIG. 16.

FIGS. 19(A) and (B) are a side end view and a top plan view, respectively, of another embodiment of an intermediate member of the optical fiber connector of FIG. 16.

DETAILED DESCRIPTION OF THE PREFERRED EMBODIMENT

Figures 7A, 7B:
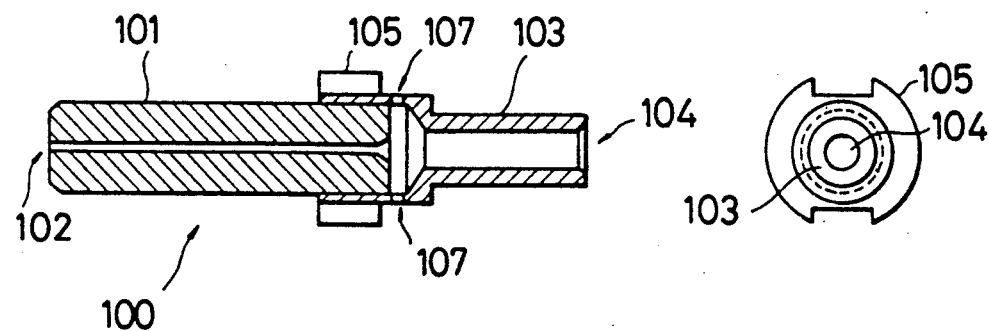
FIGS. 7(A) and (B) are a transverse cross sectional view and a side end view, respectively, of one embodiment of a ferrule according to the present invention.

Referring now to FIGS. 7(A) and (B), there is shown one embodiment of a ferrule according to the present invention.

In this first embodiment, a ferrule 100 comprises an insertion portion 101 with a puncture 102 for an optical fiber, a flange portion 103 with an open end 104 for receiving a coated optical fiber, having a tapering diameter between a part including the open end 104 which has a smaller diameter and another part including another end to be attached to the insertion portion 101 which has a larger diameter, and a keyway 105 to be engaged with connection keys of a plug housing. In addition, the flange portion 103 has at least two holes 107 which connects the region in the vicinity of the end of the puncture 102 inside the flange portion 103 with outside of the ferrule 100.

The attaching of the optical fiber to this ferrule 100 is carried out as follows. First, epoxy adhesives A are dropped from the open end 104 of the flange portion 103, as in FIG. 8(A), until the epoxy adhesives A appear from the holes 107, as in FIG. 8(B). Next, a rubber tube R is capped over the holes 107, as in FIG. 8(C) and air inside the puncture 102 of the insertion portion 101 is extracted by vacuum pumping to fill the inside of the ferrule 100 with adhesives A, as in FIG. 8(D). Then, an optical fiber is inserted into the ferrule 100 which is fixed by heating up to stiffen the adhesives A, as in FIG. 8(E).

Here, as shown in FIG. 8(E), because of the holes 107 provided in the vicinity of the end of the puncture 102 inside the flange portion 103, air in this region can completely be removed without leaving air bubbles, so that the adhesives A can be distributed homogeneously, without giving rise to an extraneous stress on the optical fiber 108 stemming from a coated optical fiber 109.

Figure 9A:
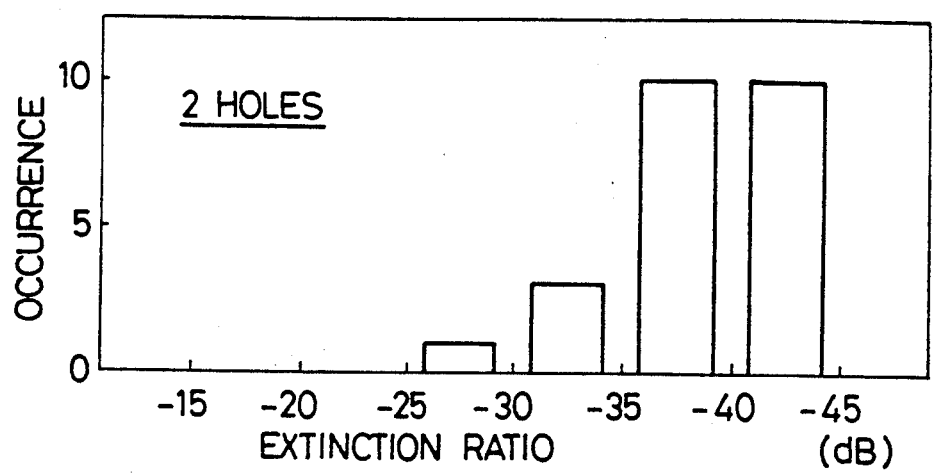
FIGS. 9(A), (B), and (C) are graphs showing number of occurrence of different extinction ratios upon trial for the ferrule of FIGS. 7(A) and (B) with two, three, and four holes, respectively.
Figure 9B:
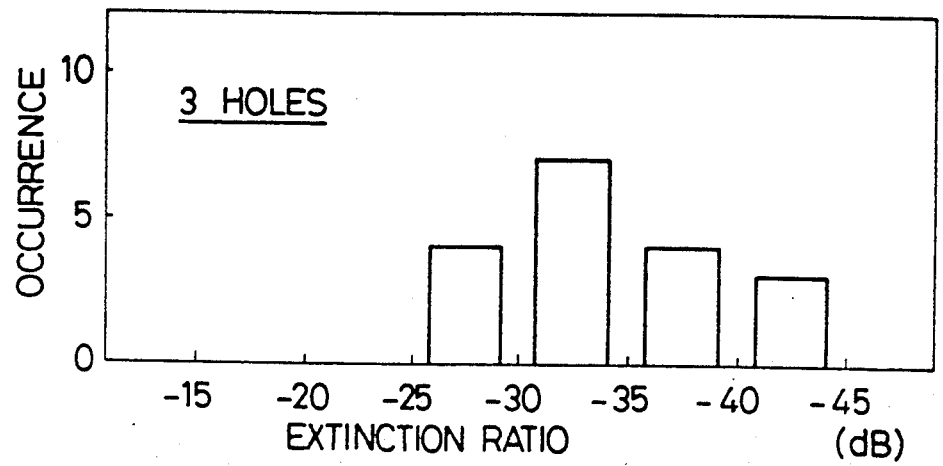
Figure 9C:
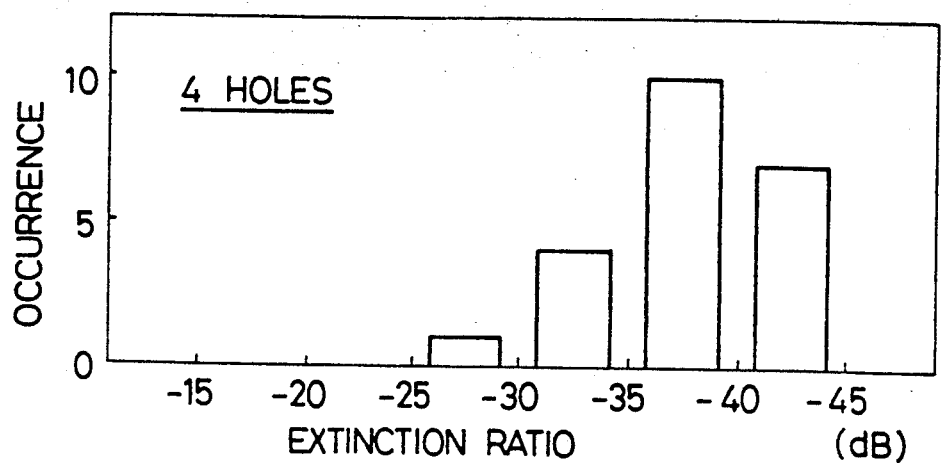

The holes 107 are preferably be either two holes arranged symmetrically across a diameter of the flange portion 103, or four holes such that two of them are arranged symmetrically across a diameter of the flange portion 103 and other two are arranged symmetrically across a diameter of the flange portion 103 in a direction perpendicular to that joining the first two. This is because, as shown in FIGS. 9(A), (B), and (C) for the cases of two, three, and four holes, respectively, lower extinction ratio can be obtained by two or four holes than three holes, when the ferrule 100 is used for connecting SMPM fibers. This is considered to be reflecting the symmetry of the SMPM fibers. Also, to have more than four holes is considered not desirable from a standpoint of the strength of the flange portion 103.

Figure 10:
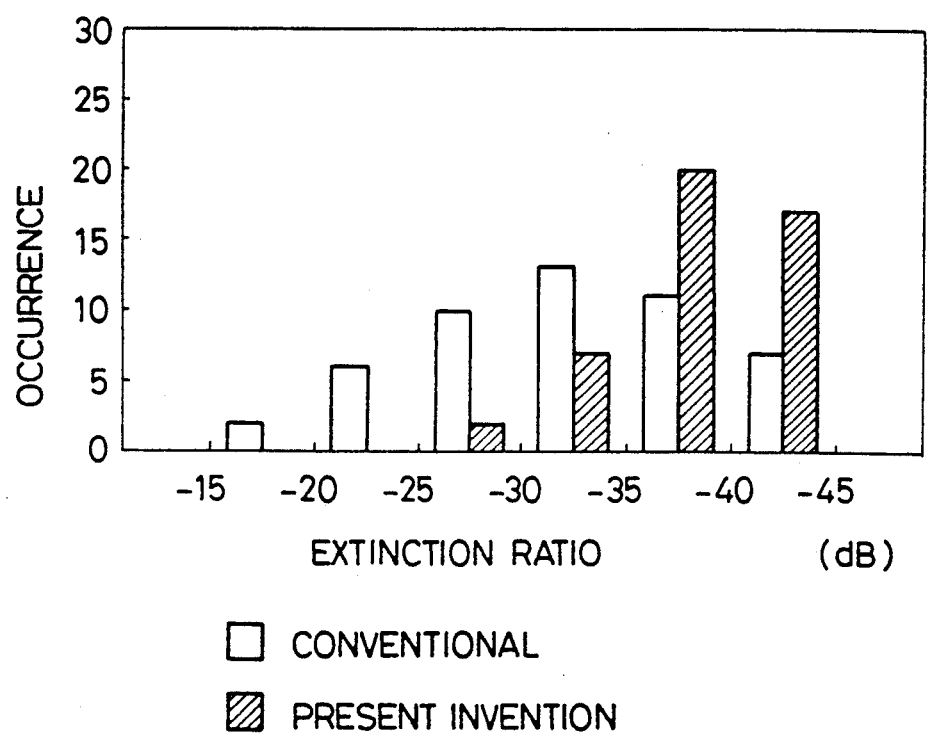
FIG. 10 is a graph showing number of occurrence of different extinction ratios upon trial for the ferrule of FIGS. 7(A) and (B) and a conventional zirconia ferrule.

The extinction ratio obtained by trials using the ferrule 100 of this embodiment and a conventional zirconia ferrule are shown in FIG. 10, which clearly demonstrates that the lower extinction ratio than that obtained by a conventional ferrule can be obtained by the ferrule 100 of this embodiment.

Figure 11A:
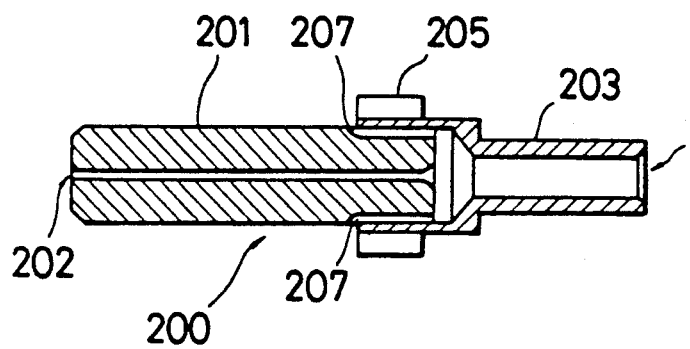
FIGS. 11(A) and (B) are transverse and longitudinal cross sectional views of another embodiment of a ferrule according to the present invention.

FIGS. 11(A) and (B) show another embodiment of a ferrule according to the present invention.

Figure 11B:
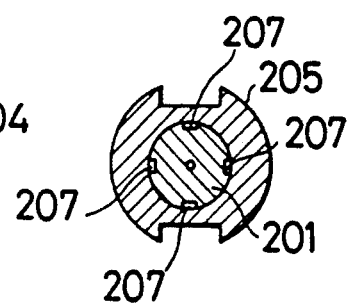

In this second embodiment, a ferrule 200 comprises an insertion portion 201 with a puncture 202 for an optical fiber, a flange portion 203 with an open end 204 for receiving a coated optical fiber, having a tapering diameter between a part including the open end 204 which has a smaller diameter and another part including another end to be attached to the insertion portion 201 which has a larger diameter, and a keyway 205 to be engaged with connection keys of a plug housing. In addition, the insertion portion 201 has at least two grooves 207 (four in FIG. 11(B) for connecting the region in the vicinity of the end of the puncture 202 inside the flange portion 203 with outside of the ferrule.

It can easily be seen that the grooves 207 of this second embodiment can fulfill the exactly same function as the holes 107 of the previous first embodiment, so that the same advantages as the first embodiment can be enjoyed as well.

The grooves 207 are also preferably be either two or four grooves arranged in manners described above for the holes 107 in the first embodiment, for the similar reason as given above.

It is to be noted that the grooves 207 may be provided on an inner surface of the flange portion 203, instead of being provided on the insertion portion 201.

Figure 12A:
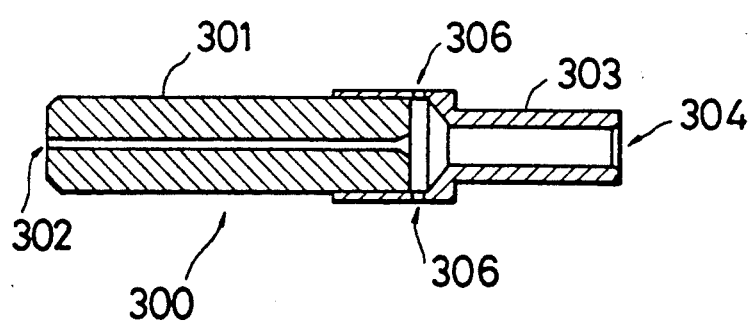
FIGS. 12(A) and (B) are a transverse cross sectional view and a side end view, respectively, of yet another embodiment of a ferrule according to the present invention.
Figure 12B:
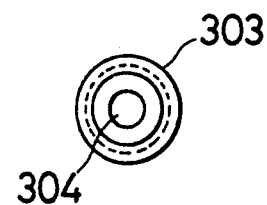

FIGS. 12(A) and (B) show yet another embodiment of a ferrule according to the present invention.

In this third embodiment, a ferrule 300 comprises an insertion portion 301 with a puncture 302 for an optical fiber, and a flange portion 303 with an open end 304 for receiving a coated optical fiber, having a tapering diameter between a part including the open end 304 which has a smaller diameter and another part including another end to be attached to the insertion portion 301 which has a larger diameter. In addition, the flange portion 303 has at least two holes 306 for connecting the region in the vicinity of the end of the puncture 302 inside the flange portion 303 with outside of the ferrule.

In other words, in this embodiment, the keyway 105 of the first embodiment above is absent, while the other features remains the same. This ferrule 300 is to be utilized for an applications other than the optical fiber connector. Such applications includes those in a collimator, in an LD module, and in an optical fiber terminal, as mentioned earlier.

Figure 13A:
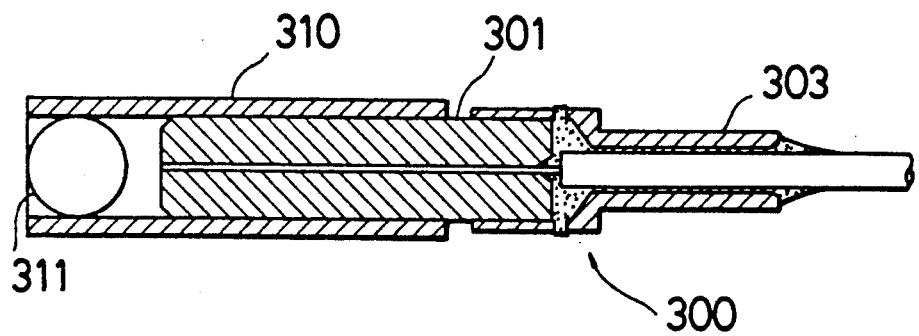
FIGS. 13(A) and (B) are transverse cross sectional views of two embodiments of a collimator using the ferrule of FIGS. 12(A) and (B).
Figure 13B:
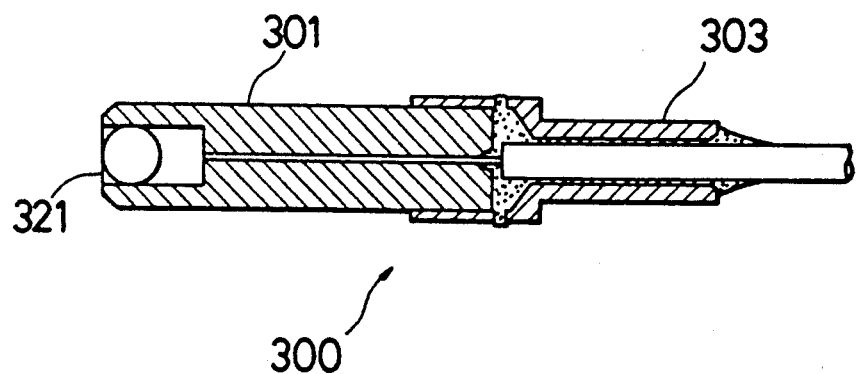

To be more specific, a collimator can be constructed either by placing the ferrule 300 inside a sleeve 310 with a lens 311, as shown in FIG. 13(A), or by placing a lens 321 inside an end of the insertion portion 301 of the ferrule 300, as shown in FIG. 13(B).

Figure 14:
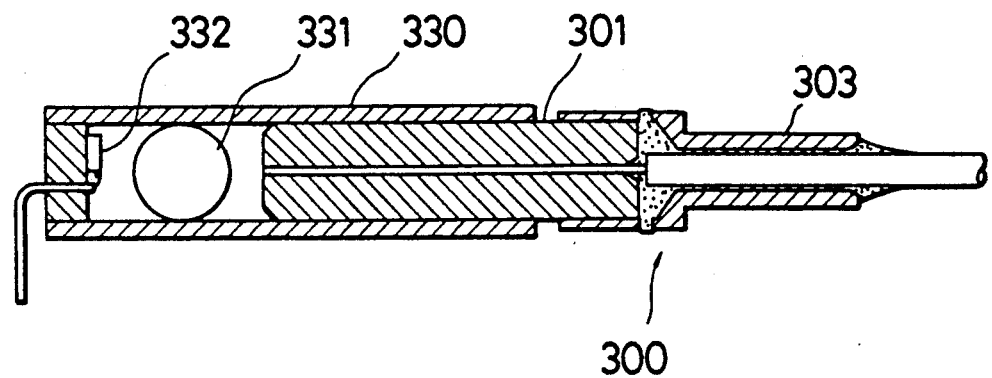
FIG. 14 is a transverse cross sectional view of one embodiment of an LD module using the ferrule of FIGS. 12(A) and (B).

Similarly, an LD module can be constructed by placing the ferrule 300 inside a sleeve 330 with a lens 331 and an LD chip 332, as shown in FIG. 14.

Figure 15:
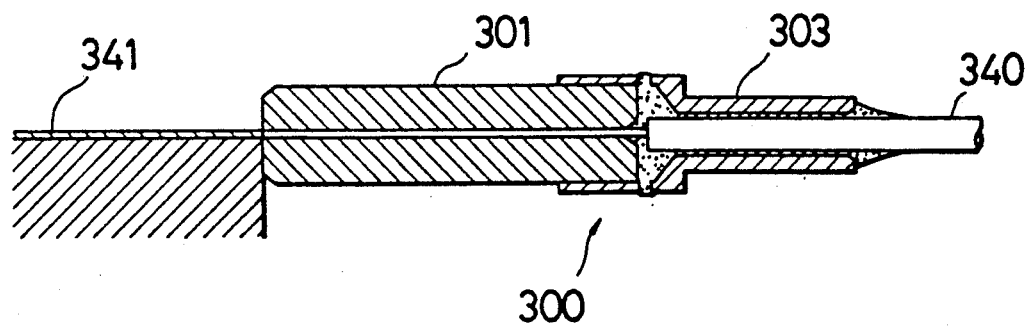
FIG. 15 is a transverse cross sectional view of one embodiment of an optical fiber terminal using the ferrule of FIGS. 12(A) and (B).

Also, the ferrule 300 can be utilized directly as an optical fiber terminal for connecting an optical fiber 340 with an optical waveguide 341, as shown in FIG. 15.

The collimator of FIGS. 13(A) or 13(B) as well as the optical fiber terminal of FIG. 15 will in practice be supported by a supporting means incorporating a fine tuning mechanism. In such circumstances, supporting of the optical fiber without the ferrule 300 of the present invention will result in a considerably deteriorated extinction ratio due to stress caused by the supporting by such supporting means.

Figure 16:
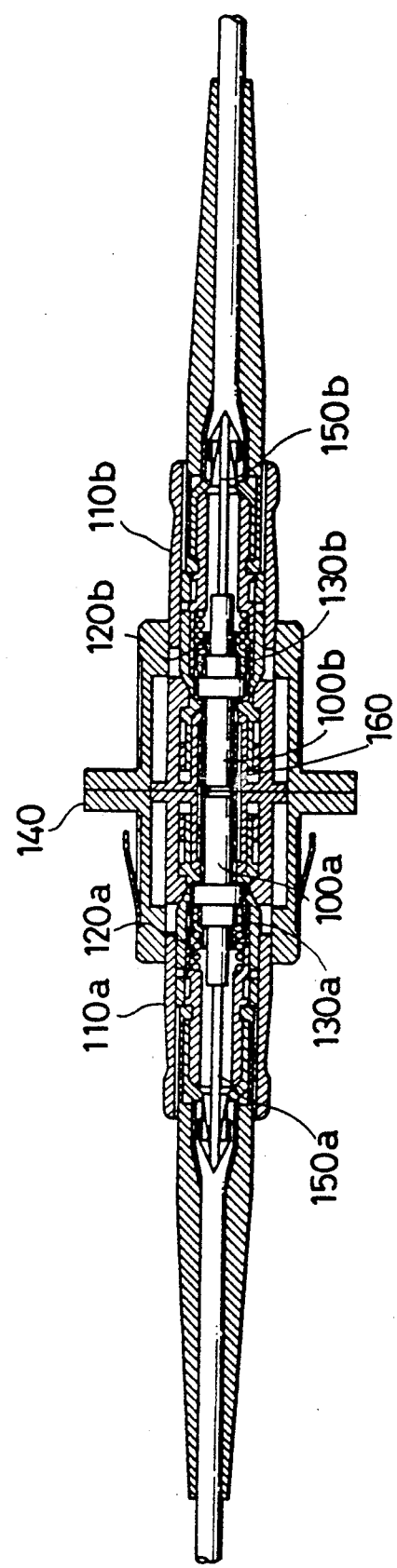
FIG. 16 is a transverse cross sectional view of one embodiment of an optical fiber connector using a ferrule according to the present invention.

Referring now to FIG. 16, there is shown one embodiment of an optical fiber connector according to the present invention, which utilized the first (or second) embodiment of a ferrule described above.

This optical fiber connector comprises a pair of plug housings 110a and 110b containing a pair of ferrules 100a and 100b attached to the coated optical fibers 150a and 150b, respectively, a pair of springs 120a and 120b, and a pair of intermediate members 130a and 130b, and an adaptor 140 containing an alignment sleeve 160 in which the ferrules 100a and 100b are contacted with each other as pressed by the springs 120a and 120b through the intermediate members 130a and 130b.

Apparently, all the advantages of the ferrule 100 described above can be attaied in this optical fiber connector.

Figures 17A, 17B:
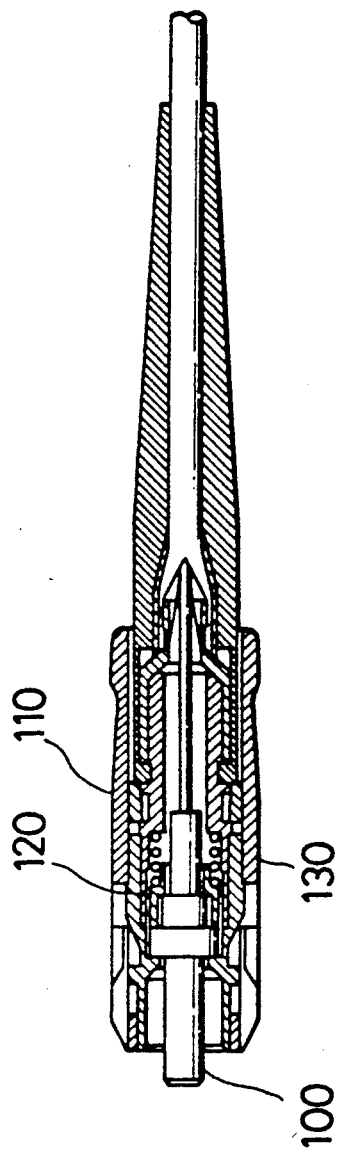
FIGS. 17(A) and (B) are side view and transverse cross sectional view of a plug housing of the optical fiber connector of FIG. 16.

In addition, as can be seen from FIGS. 17(A) and (B), in this embodiment, each one of the plug housing 110 is of a push-pull coupling type with a rectangular cross section. The ferrule 100 is installed into and positioned relative to the plug housing 110 by means of the intermediate member 120. This intermediate member 120 has a pair of keys 121, symmetrically arranged across its diameter, to be engaged with the keyway 105 of the ferrule 100, and a pair of grooves 122, symmetrically arranged across its diameter in a direction perpendicular to that joining the pair of keys 121, to be engaged with the connection keys of the plug housing 110, as shown in FIGS. 18(A) and (B).

Here, the pair of grooves 122 may be replaced by another pair of keys 123 to be engaged with the grooves provided on the plug housing 110, as shown in FIGS. 19(A) and (B). Similarly, the pair of keys 121 and the keyway 105 may be replaced by another pair of grooves on the intermediate member 120 and keys on the flange portion 103 of the ferrule 100.

Figure 20:
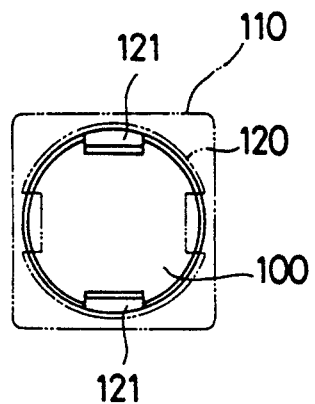
FIG. 20 is a longitudinal cross sectional view of a plug housing, an intermediate member and a ferrule in the optical fiber connector of FIG. 16 for explaining positioning of the ferrule with respect to the plug housing.

As can be seen from FIG. 20, this intermediate member 120 allows the ferrule 100 and the plug housing 110 to move only in mutually perpendicular directions, so that the angle of the ferrule 100 can be determined with high precision without the ferrule 100 and the plug housing 110 to be rigidly fixed with respect to each other.

In this optical fiber connector, when the outer diameter of the flange portion of the ferrule 100 is 4.6 mm, the clearances in the connections between the ferrule 100 and the intermediate member 120 as well as between the intermediate member 120 and the plug housing 110 can be as small as 0.025 mm, for which the maximum relative angle is:

$$\tan^{-1}(0.05/2.3) \approx 1.3°$$

and the extinction ratio in such a case is:

$$10 \log(\tan^2(1.3°)) \approx -33 \text{ dB}$$

Thus, in this embodiment, stability comparable to that obtained by the conventional optical fiber connector for the single mode optical fiber can be achieved for the SMPM fiber.

Figure 1:
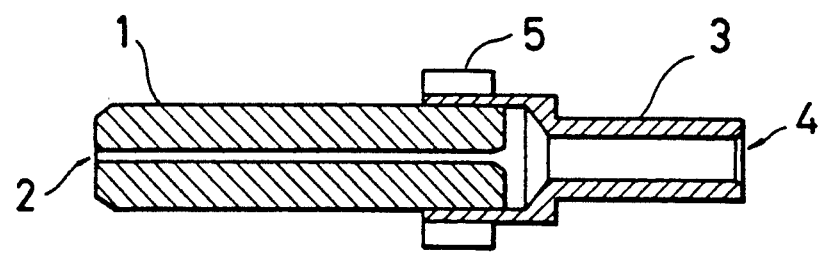
FIG. 1 is a transverse cross sectional view of a conventional zirconia ferrule.
Figure 2:
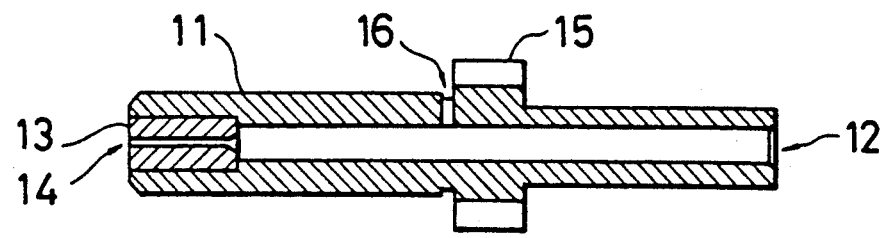
FIG. 2 is a transverse cross sectional view of a conventional capillary type ferrule.
Figure 3C:
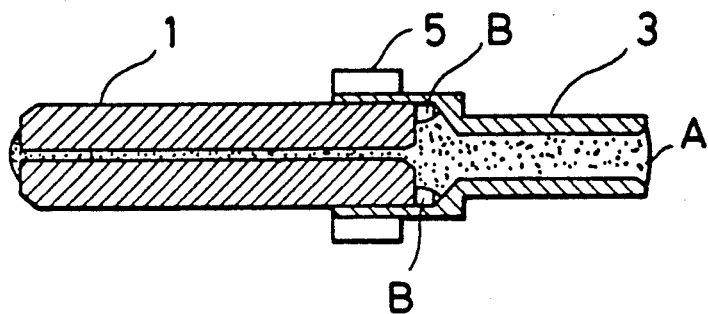
FIGS. 3(A), (B), (C) and (D) are transverse views and transverse cross sectional views of a conventional zirconia ferrule for explaining the filling of adhesives inside the ferrule, and attaching of optical fiber to the ferrule.
Figure 3D:
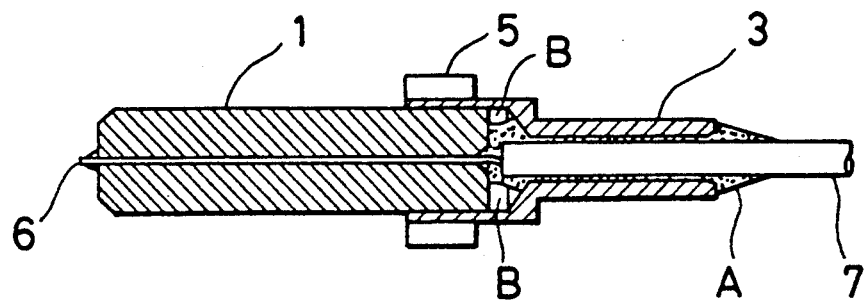
Figure 4:
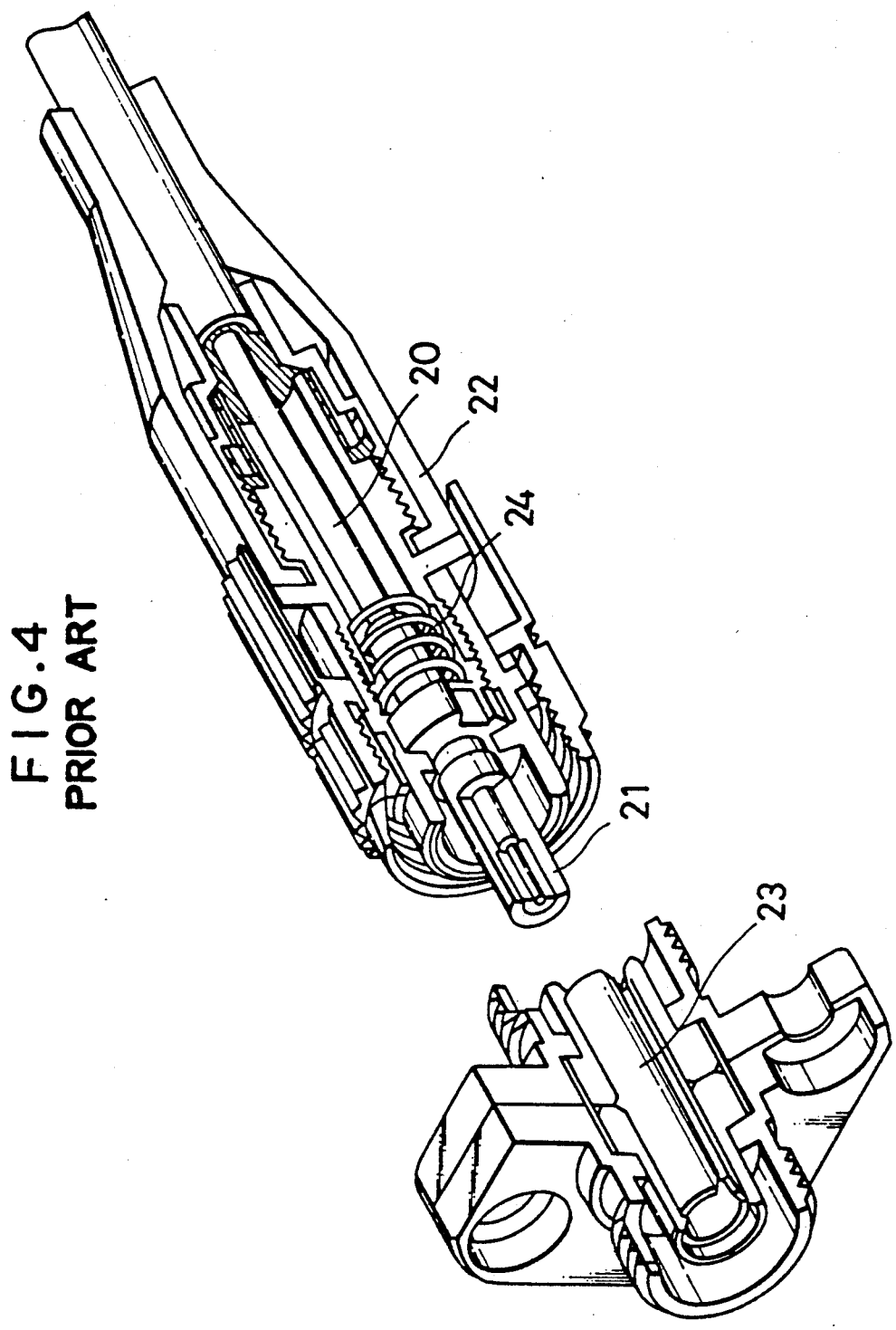
FIG. 4 is a perspective view of a conventional FC type optical fiber connector.
Figure 5A:
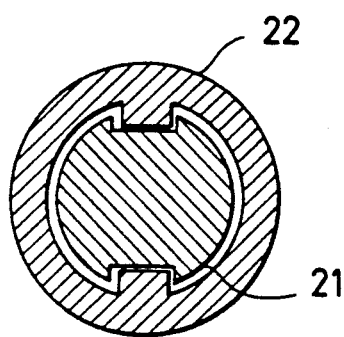
FIGS. 5(A) and (B) are longitudinal cross sectional views of a conventional optical fiber connector for explaining positioning of a ferrule with respect to a plug housing.
Figure 5B:
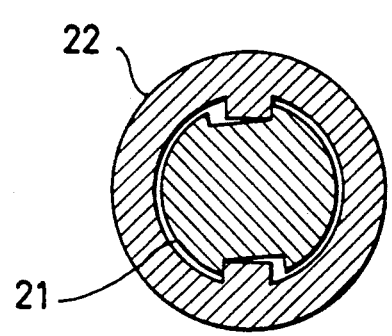
Figure 6:
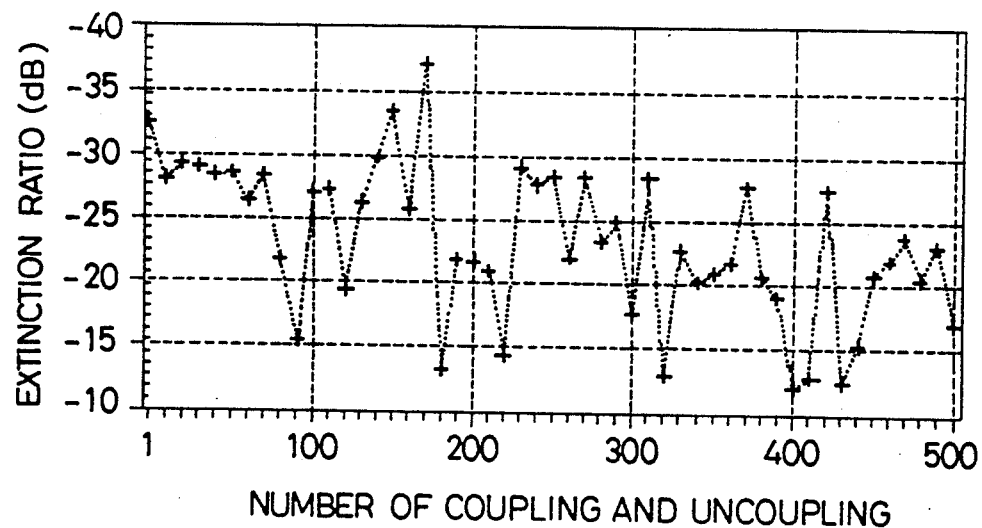
FIG. 6 is a graph of extinction ratio versus number of coupling and uncoupling for a conventional optical fiber connector used for SMPM fibers transmitting linearly polarized light.
Figure 21:
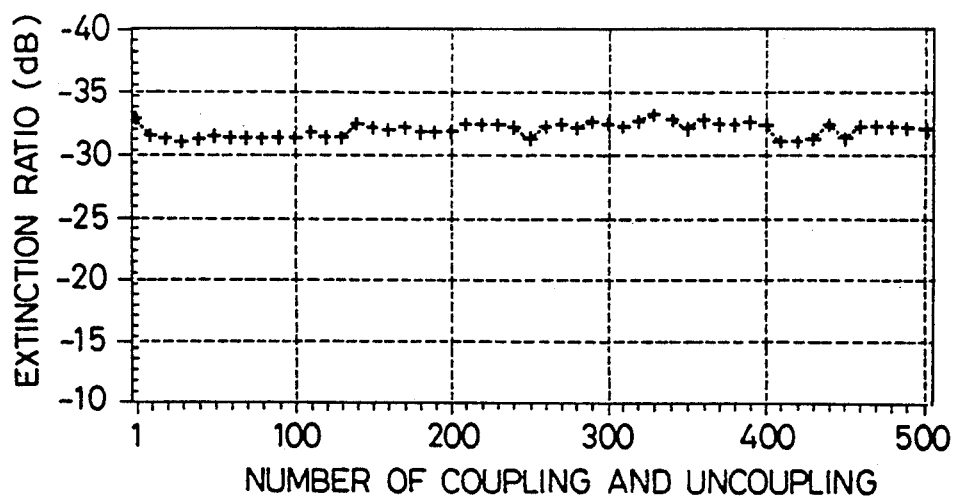
FIG. 21 is a graph of extinction ratio versus number of coupling and uncoupling for the optical fiber connector of FIG. 16 used for SMPM fibers transmitting linearly polarized light.

This is clearly demonstrated in FIG. 21 which shows the extinction ratios as a function of a number of coupling and uncoupling, obtained by trials using this embodiment of an optical fiber connector for SMPM fibers. The significant improvement achieved by this embodiment is obvious upon comparing this result with that shown in FIG. 6 which is obtained by the conventional FC type optical fiber connector used for SMPM fiber.

It is to be noted that the connections by key and groove combinations in the above embodiments may be replaced by other connection means furnishing the same function.

Also, the arrangement inside the plug housing 110 of the ferrule 100, the intermediate member 120, and the spring 130 may be altered without losing the merit of the present invention.

Besides these, many modifications and variations of the above embodiments may be made without departing from novel and advantageous features of the present invention. Accordingly, all such modifications and variations are intended to be included within the scope of the appended claims.

What is claimed is:

1. A ferrule for optical fibers transmitting linearly polarized light, comprising:
   an insertion portion having a puncture for an optical fiber; and
   a flange portion having an open end for receiving a coated optical fiber, having a tapering inner diameter between a part including the open end which has a smaller diameter and another part including another end to be attached to the insertion portion which has a larger diameter;
   said ferrule including at least two paths connecting a region in a vicinity of an end of the puncture inside the flange portion with the outside of the ferrule.

2. The ferrule of claim 1, wherein the paths comprises two paths arranged symmetrically across a diameter of the flange portion, or four paths such that first two of them are arranged symmetrically across a diameter of the flange portion and second two are arranged symmetrically across a diameter of the flange portion in a direction perpendicular to that joining the first two.

3. The ferrule of claim 2, wherein the paths are holes on the flange portion.

4. The ferrule of claim 2, wherein the paths are grooves on the insertion portion.

5. The ferrule of claim 2, wherein the paths are grooves on an inner surface of the flange portion.

6. The ferrule of claim 1, further comprising connection means for providing external engagement of said ferrule.

7. The ferrule of claim 6, wherein the connection means includes keys.

8. The ferrule of claim 6, wherein the connection means includes grooves.

9. The ferrule of claim 1, wherein the insertion portion includes an optical lens at one end of the puncture.

10. An optical fiber connector for optical fiber transmitting linearly polarized light, comprising:
    a pair of ferrules to be contacted with each other, each ferrule including:
    an insertion portion with an end face to be contacted and a puncture for an optical fiber reaching to an end face to be contacted; and
    a flange portion with an open end for receiving a coated optical fiber, having a tapering inner diameter between a part including the open end which has a smaller diameter and another part including another end to be attached to the insertion portion which has a larger diameter, said ferrule including at least two paths connecting a region in a vicinity of an end of the puncture inside the flange portion with the outside of the ferrule;

a pair of plug housings for installing the pair of ferrules, each plug housing including a spring for pressing the ferrule installed along its central axis; and an alignment sleeve for receiving the insertion portions of the pair of ferrules such that the end faces of the pair of ferrules are contacted with each other.

11. The optical fiber connector of claim 10, further comprising a pair of intermediate members for joining the pair of ferrules and the pair of plug housings.

12. The optical fiber connector of claim 11, wherein each of the ferrules further includes external connection means, symmetrically arranged along a first direction across a diameter of the ferrule, for providing external engagement, and wherein each of the plug housings includes internal connection means, arranged symmetrically along a second direction perpendicular to the first direction, for providing internal engagement, and wherein each of the intermediate members includes engagement means to be engaged with the external connection means and the internal connection means.

13. The optical fiber connector of claim 12, wherein the external connection means, internal connection means, and the engagement means are keys and grooves to be engaged together.

14. The optical fiber connector of claim 10, wherein the paths of each ferrule comprises two paths arranged symmetrically across a diameter of the flange portion, or four paths such that first two of them are arranged symmetrically across a diameter of the flange portion and second two are arranged symmetrically across a diameter of the flange portion in a direction perpendicular to that joining the first two.

15. The optical fiber connector of claim 14, wherein the paths of each ferrule are holes on the flange portion.

16. The optical fiber connector of claim 14, wherein the paths of each ferrule are grooves on the insertion portion.

17. The optical fiber connector of claim 14, wherein the paths of each ferrule are grooves on an inner surface of the flange portion.

* * * * *